United States Patent
Taylor, Jr. et al.

(10) Patent No.: US 12,428,854 B2
(45) Date of Patent: *Sep. 30, 2025

(54) INSULATED WALL PANEL

(71) Applicant: DDP Specialty Electronic Materials US, LLC., Wilmington, DE (US)

(72) Inventors: Charles David Taylor, Jr., Salisbury, NC (US); Paul Addison Brown, Salisbury, NC (US); Berthold Mueller, Salisbury, NC (US); Randal Scott Hoffner, Salisbury, NC (US); Stewart Mcintyre Adams, Salisbury, NC (US)

(73) Assignee: DDP Specialty Electronic Materials US, LLC., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/940,623

(22) Filed: Nov. 7, 2024

(65) Prior Publication Data

US 2025/0059772 A1 Feb. 20, 2025

Related U.S. Application Data

(60) Division of application No. 18/806,270, filed on Aug. 15, 2024, which is a continuation of application No. (Continued)

(51) Int. Cl.
| | |
|---|---|
| *E04F 13/08* | (2006.01) |
| *B29C 44/12* | (2006.01) |
| *E04C 2/04* | (2006.01) |
| *E04F 13/075* | (2006.01) |
| *E04F 13/077* | (2006.01) |

(Continued)

(52) U.S. Cl.
CPC ......... *E04F 13/0873* (2013.01); *B29C 44/12* (2013.01); *E04C 2/04* (2013.01); *E04F 13/075* (2013.01); *E04F 13/077* (2013.01); *E04F 13/0832* (2013.01); *E04F 13/0862* (2013.01); *E04F 13/0866* (2013.01); *E04F 13/0875* (2013.01); *E04F 13/14* (2013.01); *E04F 13/165* (2013.01); *E04C 2/288* (2013.01)

(58) Field of Classification Search
CPC ... E04F 13/0873; E04F 13/075; E04F 13/077; E04F 13/0832; E04F 13/0862; E04F 13/0866; E04F 13/0875; E04F 13/14; E04F 13/165; B29C 44/12; E04C 2/04; E04C 2/288
See application file for complete search history.

(56) References Cited

U.S. PATENT DOCUMENTS

| | | | | |
|---|---|---|---|---|
| 5,631,097 | A * | 5/1997 | Andersen | B32B 37/00 428/312.4 |
| 2003/0113520 | A1 * | 6/2003 | Takahashi | D21H 27/28 428/201 |

* cited by examiner

*Primary Examiner* — Christina A Johnson
*Assistant Examiner* — Kelsey C Grace
(74) *Attorney, Agent, or Firm* — IShumaker, Loop & Kendrick, LLP

(57) ABSTRACT

The invention is related to a method of manufacturing a wall panel and a wall panel system. The method includes forming a glass-fiber reinforced cementitious layer including the steps of: pouring or injecting a slurry of uncured cementitious product into a mold, embedding glass fiber reinforcing material therein, and curing the cementitious product to obtain a cured cementitious product having a first side and a second side; and applying, to the second side of the cured cementitious product, an insulation layer, the insulation layer comprising a foam.

9 Claims, 5 Drawing Sheets

Related U.S. Application Data

18/339,542, filed on Jun. 22, 2023, now Pat. No. 12,091,864, which is a continuation of application No. 15/907,503, filed on Feb. 28, 2018, now abandoned, which is a continuation of application No. 15/138,638, filed on Apr. 26, 2016, now Pat. No. 9,957,722, which is a continuation of application No. 14/039,101, filed on Sep. 27, 2013, now Pat. No. 9,353,523.

(60) Provisional application No. 61/706,148, filed on Sep. 27, 2012.

(51) Int. Cl.
*E04F 13/14* (2006.01)
*E04F 13/16* (2006.01)
*E04C 2/288* (2006.01)

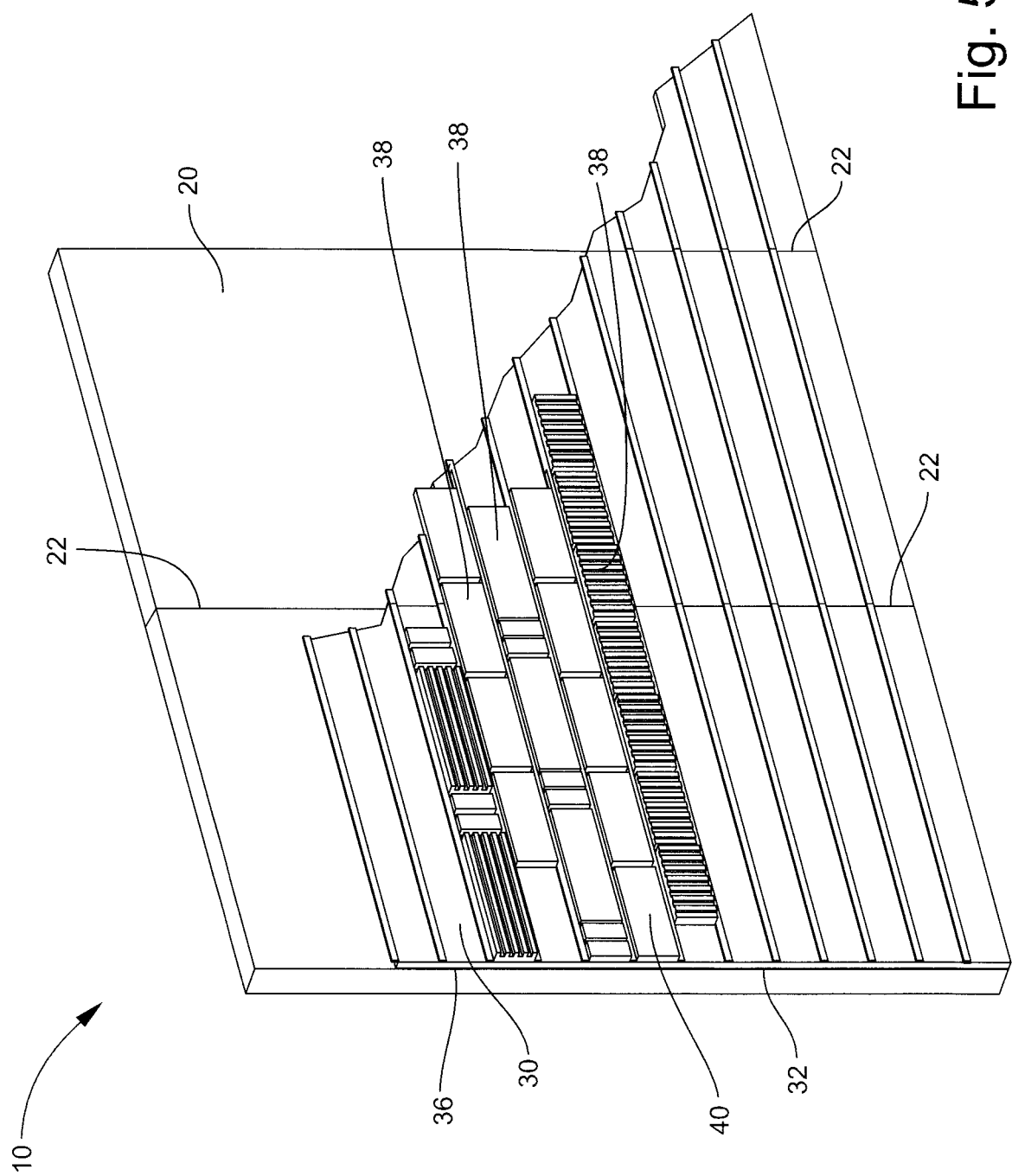

INSULATED WALL PANEL

CROSS-REFERENCE TO RELATED PATENT APPLICATIONS

This application is a divisional of co-pending U.S. patent application having application Ser. No. 18/806,270, filed on Aug. 15, 2024, which itself is a continuation of U.S. patent application having application Ser. No. 18/339,542, filed on Jun. 22, 2023, which itself is a continuation of U.S. patent application having application Ser. No. 15/907,503 filed on Feb. 28, 2018, which itself is a continuation of U.S. patent application having application Ser. No. 15/138,638 filed on Apr. 26, 2016, which itself is a continuation of U.S. patent application having application Ser. No. 14/039,101 filed on Sep. 27, 2013, which itself is a nonprovisional application tracing priority to U.S. provisional patent application having application No. 61/706,148 filed on Sep. 27, 2012. This application claims the full benefit of, traces priority to, and expressly incorporates by reference the entirety of all of the Ser. No. 15/907,503 application, the Ser. No. 15/138,638 application, the Ser. No. 14/039,101 application, and the 61/706,148 application.

TECHNICAL FIELD AND BACKGROUND OF INVENTION

The invention relates to the field of building construction materials. More particularly, the invention relates to the field of construction components used in the construction of walls and other planar surfaces for buildings.

Humans have utilized bricks and other hard surfaces as construction components for buildings for thousands of years. The earliest sun dried bricks were made in Ancient Egypt. Later, bricks were dried using a fuel source. The Book of Genesis records that burnt brick was used in the construction of the Tower of Babel. Thus, from ancient times to the present, brick has remained a popular building material.

The enduring presence of brick is due in no small part to its stellar properties as an exterior surface. Bricks are capable of resisting high summer heat as well as cold winters and changes there between. In addition to such thermal properties, brick provides a strong outer shell to a building. Brick resists wind, rain, snow, dust and other detrimental environmental elements. Bricks can be manufactured in a myriad of sizes, textures, and colors. Further, though it need not be painted, when brick is painted, the paint adheres well to the brick.

However, despite such positive characteristics, brick has a few drawbacks, mostly related to installation. For instance, whereas other exterior surfaces may be relatively easily applied to an existing building structure, brick is much more difficult to install on an existing building as an alternate siding choice during a renovation. Further, the laying of brick during the construction of a building is a labor intensive operation. Each brick must be mortared and laid, one on another, brick by brick, by a skilled brick mason. As manual labor prices rise in a given market, so do the costs associated with using brick as a building material.

Thus, there exists a need for a building product that has the same or better building characteristics and aesthetic appeal as traditional brick but also can be applied without the need for an extensive skilled labor team of brick masons. Further, there exists a need for a building product that has the same or better building characteristics and aesthetic appeal as traditional brick that may be used as a retro-fit product for providing a siding to an existing building structure. Further, as energy costs and environmental consciousness increase, so too does the demand for better insulation. Thus, there is also a need for building materials offering improved insulation of a building's envelope.

SUMMARY OF THE INVENTION

In one aspect, the invention includes a method of manufacturing a wall panel. The method includes: forming a glass-fiber reinforced cementitious layer which includes the steps of: i) pouring or injecting a slurry of uncured cementitious product into a mold, ii) embedding glass fiber reinforcing material therein, and iii) curing the cementitious product to obtain a cured cementitious product having a first side and a second side; and applying, to the second side of the cured cementitious product, an insulation layer, the insulation layer comprising a foam.

In some embodiments, the glass-fiber reinforcing material is configured to be the principal load carrying member of the wall panel.

In some embodiments, the method further includes applying a veneer layer to the first side of the cured cementitious product. In some embodiments, the veneer layer is clay brick, ceramic tile, porcelain tile, natural stone, engineered stone, or paint. In some embodiments, the veneer layer functions as a water-resistive barrier.

In some embodiments, the insulation layer has a uniform thickness and an insulation factor greater than or equal to R7 and less than or equal to R21.

In another aspect, the invention includes a method of forming a wall panel system for a building structure. The method includes: a) providing a plurality of wall panels, each of the plurality of wall panels comprising: a middle layer having a first side and a second side, the middle layer comprising: cementitious product and glass fiber reinforcing material embedded therein; and a foam layer on the second side of the middle layer; b) securing each of the plurality of wall panels to a structural element; wherein seams between the respective wall panels are sealed.

In some embodiments, the seams are sealed with a sealing compound.

In some embodiments, each of the plurality of wall panels further comprises a veneer layer attached to the first side of the middle layer. In some embodiments, the veneer layer is clay brick, ceramic tile, porcelain tile, natural stone, engineered stone, or paint. In some embodiments the veneer layer functions as a water-resistive barrier.

In some embodiments, the method of forming a wall panel system further includes, after step b), step c) applying a veneer layer to the first side of the middle layer. In some embodiments, the veneer layer is clay brick, ceramic tile, porcelain tile, natural stone, engineered stone, or paint. In some embodiments the veneer layer functions as a water-resistive barrier.

In some embodiments, the glass-fiber reinforcing material is configured to be the principal load carrying member of the wall panel.

In some embodiments, the insulation layer has a uniform thickness and an insulation factor greater than or equal to R7 and less than or equal to R21.

In another aspect, the present invention includes a wall panel. The wall panel includes a middle layer having a first side and a second side, the middle layer comprising a cementitious product and a glass fiber reinforcing material; and a foam layer attached to the second side of the middle layer.

In some embodiments, the wall panel further comprises a veneer layer on the first side of the middle layer. In some embodiments the veneer layer is clay brick, ceramic tile, porcelain tile, natural stone, engineered stone, or paint. In some embodiments the veneer layer functions as a water-resistive barrier.

In some embodiments, the middle layer is a poured, injected, press-molded, extruded, vibration cast, sprayed, or slip formed layer.

BRIEF DESCRIPTION OF THE DRAWINGS FIGURES

Features, aspects, and advantages of a preferred embodiment of the invention are better understood when the detailed description is read with reference to the accompanying drawing, in which:

FIG. 5 is a perspective view of an embodiment of the invention showing adjacent panels with the outer veneer layer partially attached and covering the joint between two adjacent panels.

DETAILED DESCRIPTION

Figure 1:
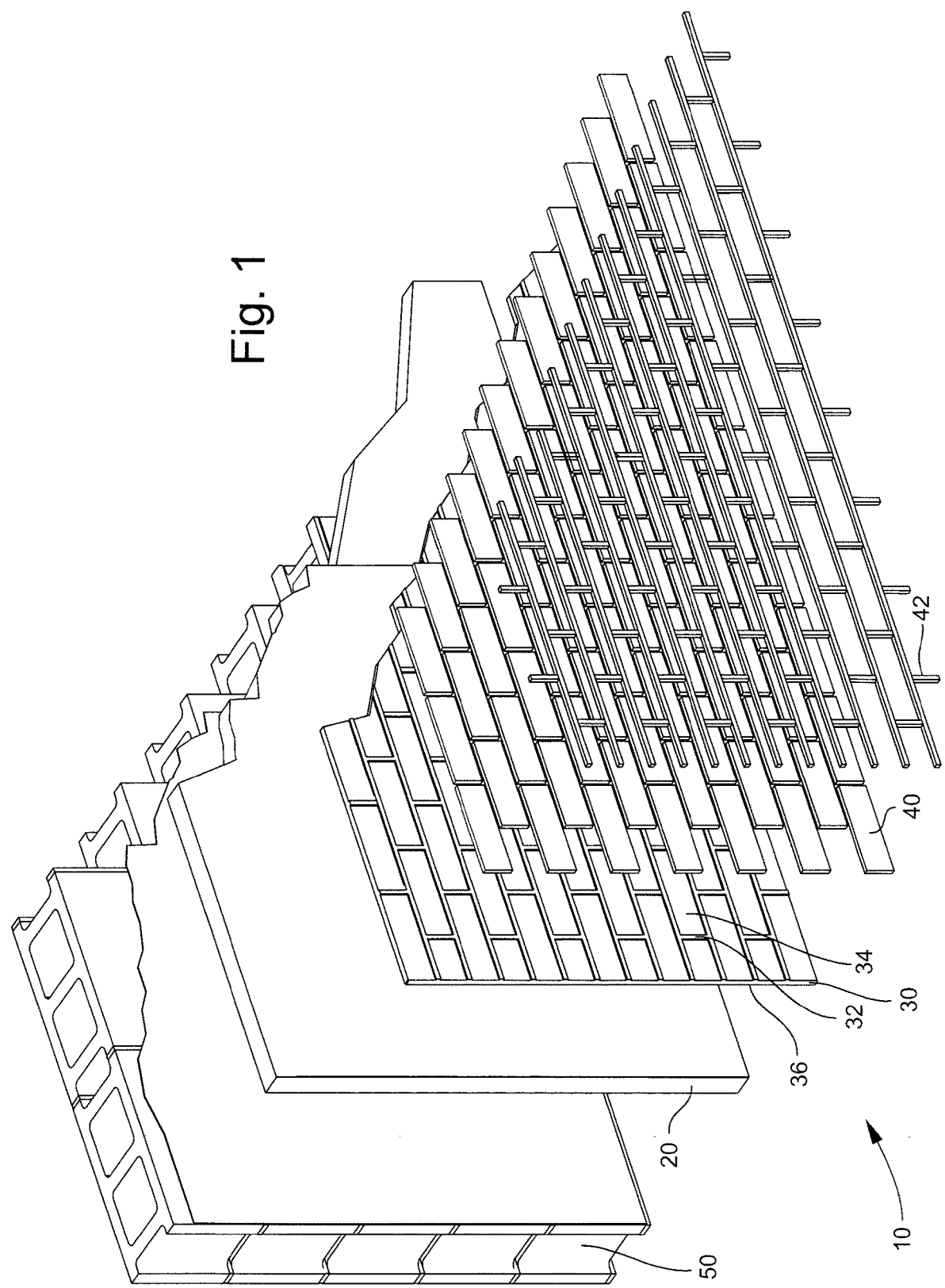
FIG. 1 is an exploded perspective view of an embodiment of the invention showing the layers.

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

Referring to FIGS. 1-5, the invention is an insulated wall panel 10 having three layers, 20, 30, and 40. The panel 10 provides a finished aesthetic surface to a building, a structural component to a building, and an insulation factor for a building. As such, the installed wall panel 10 includes an inner insulation layer 20, a middle cement layer 30, and an outer veneer layer 40. The panel 10 may be attached to a building wall 50.

Figure 4:
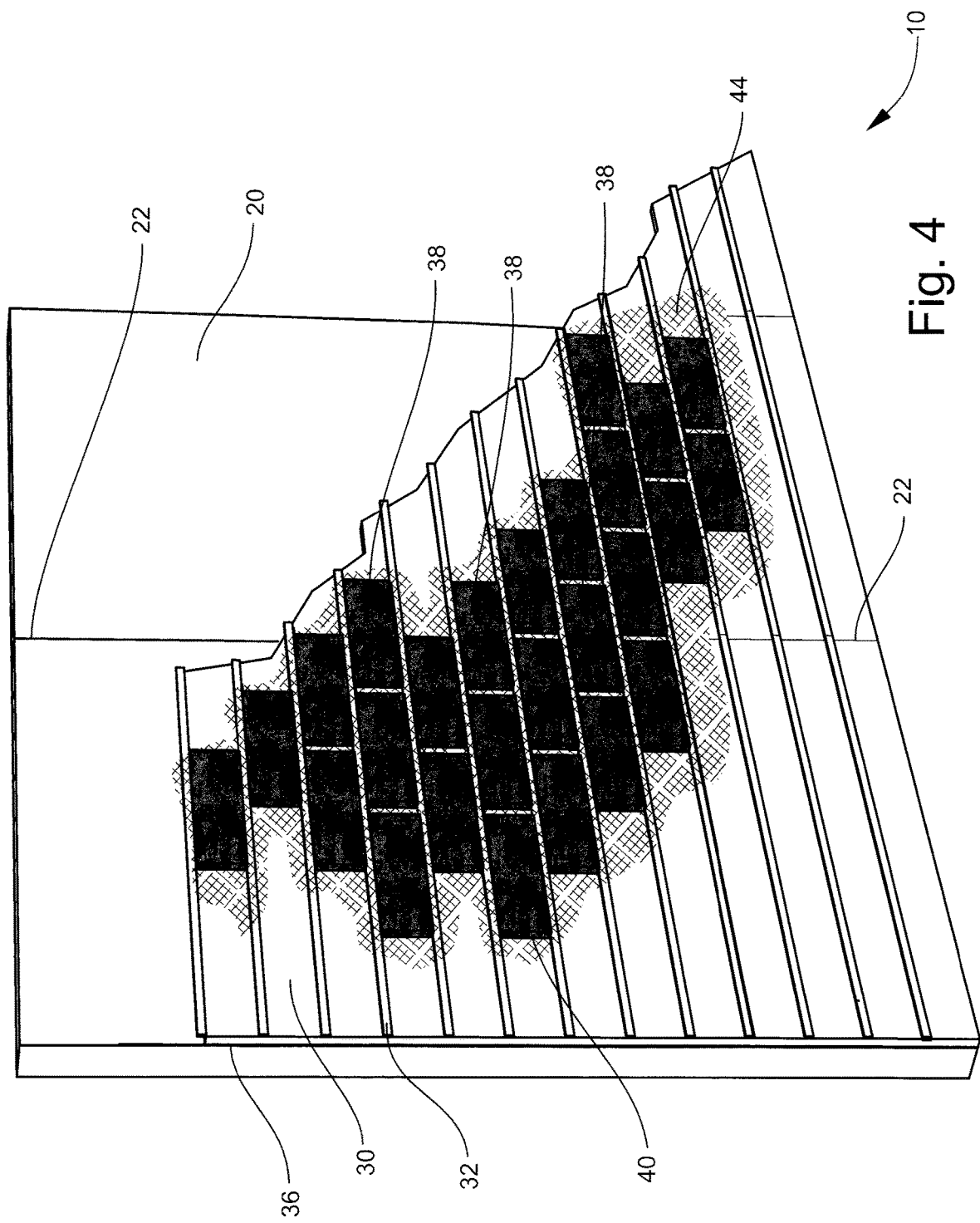
FIG. 4 is perspective view of an embodiment of the invention showing two adjacent panels with the outer veneer layer partially attached and covering the joint between the two adjacent panels.

The outer veneer layer 40 may include brick (as shown in the drawings) but may also include stone, tile, engineered stone, and/or similar material depending on desired finish effect. Thus, the use of the term "brick" herein is synonymous and inclusive of other veneers thus listed. The veneer layer 40 is relatively thin and is attached to the middle cement layer 30 using mortar 44 or other appropriate material such as a chemical adhesive as best shown in FIG. 4. Each brick (or other material as desired) of the veneer layer 40 is thin and is defined by a perimeter.

The middle layer 30 provides a substrate to which the brick of the veneer 40 is applied upon installation on a building structure 50. The middle layer 30 has a plurality of sets of relief lines 32. Each set of relief lines 32 define a boundary that is just larger than the perimeter of a particular brick of the veneer layer 40 that is to be applied to the middle layer 30. The relief lines 32 may be formed to the thickness of the desired grout 42 spacing between the brick of the veneer layer 40.

The middle layer 30 is made of a cementatious product with a glass fiber reinforcing material embedded therein. The glass fiber has a high strength and is the principal load-carrying member of the middle layer 30 while the cement forms a matrix that allows the fibers to retain their desired location and orientation. The resultant product is thin and strong.

In order to form the middle layer 30, a mold is first constructed into which a slurry of uncured cementatious product of the middle layer 30 is poured. The mold will have the negatives of the relief lines 32 formed therein. These negatives will appear as small trenches within the mold such that when the cement cures and the middle layer 30 is removed from the mold, the relief lines 32 will protrude outward from the otherwise generally planar outer surface 34 of the middle layer. The inner surface 36 of the middle layer 30 will also be generally planar but will not have such relief lines 32. The middle layer 30 may remain in the mold while curing. Curing time is dependent upon the thickness, particulars of the mix design, and the environment in which the cement is being cured. Preferably, the middle cement layer 30 is cured in a chamber.

Once cured, the middle layer 30 is then placed in a fixture that allows the inner insulation layer 20 to be applied and attached to the inner surface 36 of the middle layer 30. The inner insulation layer 20 is a rigid pour foam that is formed from a two part Class I rated urethane. The foam is non-CFC and non-HCFC. The foam is applied to the inner surface 36 of the middle layer 30 using a machine calibrated to deliver proper and consistent component mix. The finished urethane material 20 will have an in place density of approximately 2.2 pounds per cubic foot. The foam 20 adheres to the middle layer 30 such that the machine delivery and mixing of the components provides for a complete bond between the middle layer 30 and inner insulation layer 20. Thus, there are no adhesives or other chemical bonding required to achieve the strength of the final insulated panel 10. The inner insulation layer 20 may be one inch thick or up to three inches thick or greater depending on the level of insulation desired for a particular application.

Alternatively, rather than being poured, the middle layer 30 may be press-molded, extruded, vibration cast, sprayed, or slip formed. If, in alternate embodiments, attachment points 54 or other items are incorporated into the structure they are placed in the mold prior to the injection of the urethane.

Figure 2:
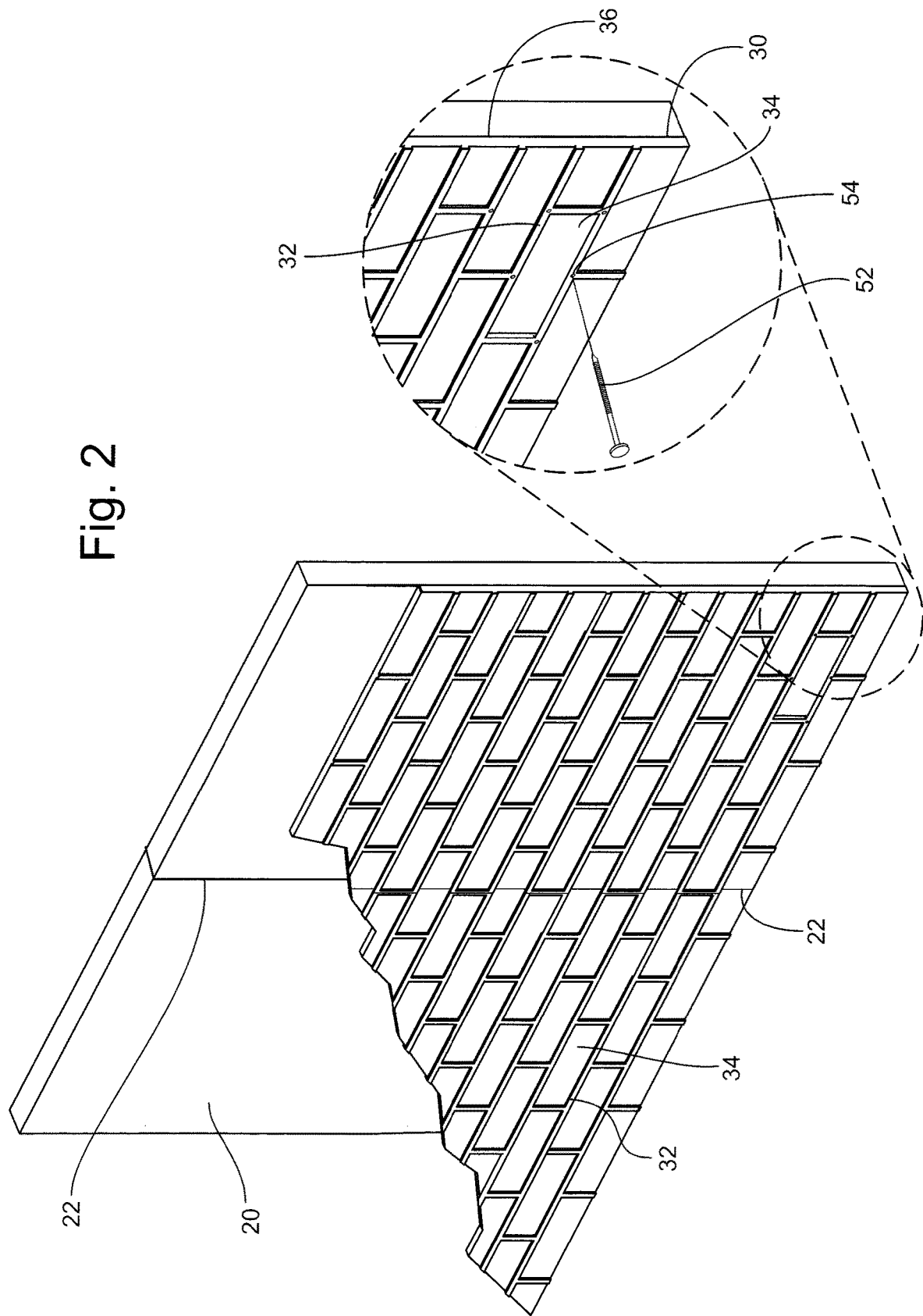
FIG. 2 is a partial perspective view of an embodiment of the invention showing two adjacent panels and highlighting the attachment of the panels to a wall.
Figure 3:
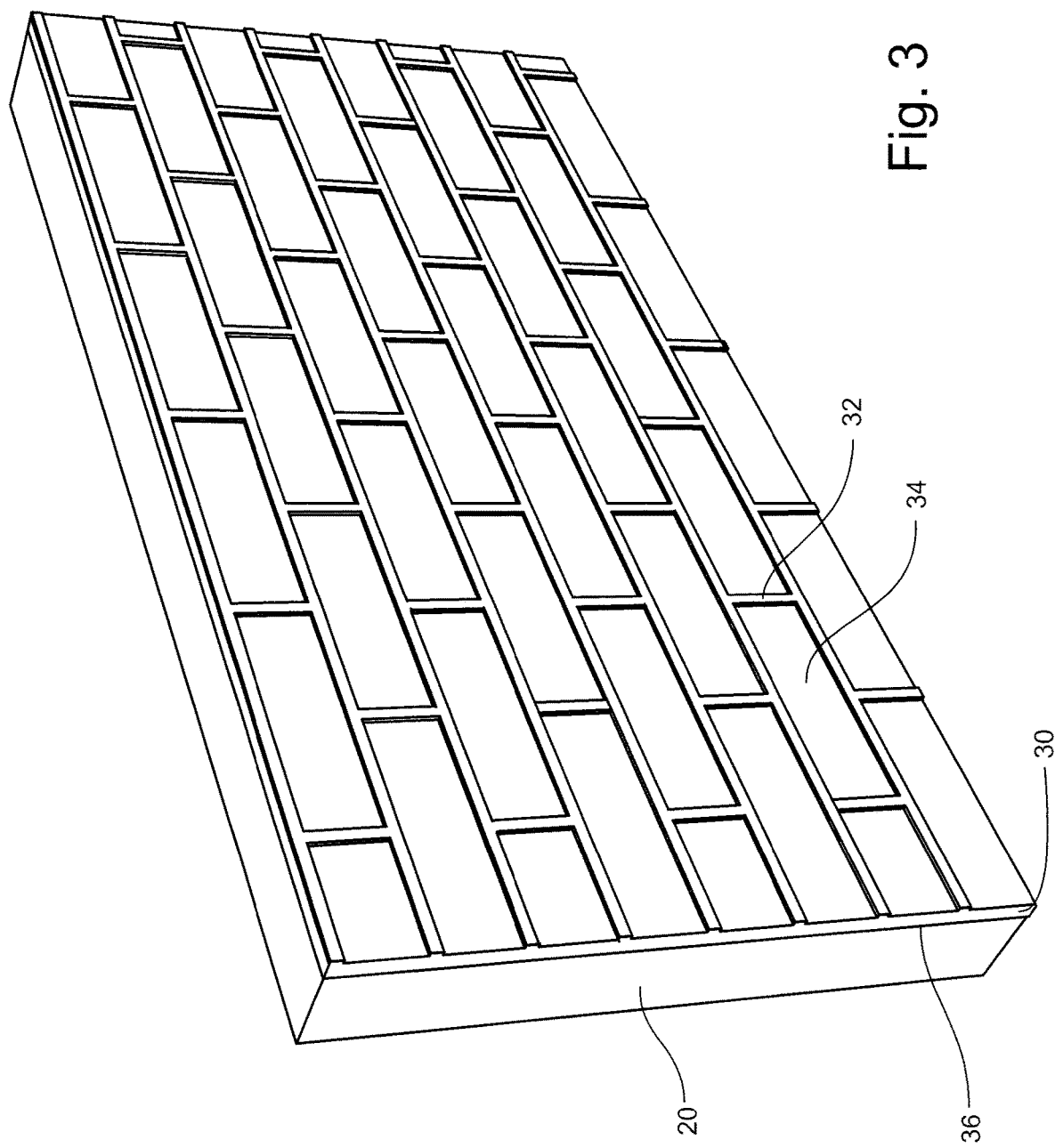
FIG. 3 is a perspective view of an embodiment of the invention showing one panel without the outer veneer layer attached.

Once the cement and urethane foam of the respective middle 30 and inner 20 layers has cured, the panel 10 is in condition for application to a building 50. As shown in FIG. 2, the panels 10 are screwed with screws 52 to the wall 50 or other structural element of a building. End pieces, headers, and other trim pieces, having been similarly manufactured, are likewise attached to the building. The seams 22 between the respective panels and trim pieces are sealed with a sealing compound, such as Laticrete® Air and Water Barrier. Next, as shown in FIG. 4, an adhesive such as mortar 44 is applied to the outer surface of the middle layer 30. Next, the brick of the veneer layer 40 are applied on top of the adhesive 44 and between the relief lines 32. The brick of the veneer 40 are applied to overlap 38 the seams 22 in the panels 10. This overlapping 38 of the seams is best shown in FIGS. 4 and 5. Finally, a grout 42 or other material is applied between the gaps in the brick of the veneer 40.

We claim:

1. A method of manufacturing a wall panel, the method comprising:
   forming a reinforced cementatious layer including the steps of:
   i) pouring or injecting a slurry of uncured cementatious product into a mold,
   ii) embedding reinforcing material therein, and
   iii) curing the cementatious product to obtain a cured cementatious product having a first side and a second side;
   applying, to the second side of the cured cementatious product, an insulation layer, the insulation layer comprising a foam, wherein the insulation layer is chemically bound to the second side of the cured cementatious product without the use of an adhesive; and
   applying a veneer layer to the first side of the cured cementatious product.

2. The method according to claim 1, wherein the reinforcing material is configured to be the principal load carrying member of wall panel.

3. The method according to claim 1, wherein the veneer layer is clay brick, ceramic tile, porcelain tile, natural stone, engineered stone, or paint.

4. The method according to claim 3, wherein the veneer layer functions as a water-resistive barrier.

5. A method of forming a wall panel system, the method comprising:
   a) providing a plurality of wall panels, each of the plurality of wall panels comprising:
      a middle layer having a first side and a second side, the middle layer comprising: cementatious product and reinforcing material embedded therein; and
      a foam layer having a complete chemical bond to the second side of the first middle layer without the use of an adhesive; and
   b) securing each of the plurality of wall panels to a structural element;
   wherein seams between the respective wall panels are sealed.

6. The method according to claim 5, further comprising, after step a), applying a veneer layer to the first side of the middle layer.

7. The method according to claim 6, wherein the veneer layer is clay brick, ceramic tile, porcelain tile, natural stone, engineered stone, or paint.

8. The method according to claim 5, wherein the seams are sealed with a sealing compound configured to create a water-resistant barrier.

9. The method according to claim 5, wherein the foam layer comprises an insulation layer comprising a two-part rigid urethane pour foam.

* * * * *